(No Model.)

D. L. ROBERTS.
PROPORTIONAL BALANCE.

No. 308,198. Patented Nov. 18, 1884.

Witnesses:
James H. Reynolds
L. M. Bates

Inventor:
Daniel L. Roberts
Frank Sheehy
Attorney

UNITED STATES PATENT OFFICE.

DANIEL L. ROBERTS, OF ROYALTON, NEW YORK.

PROPORTIONAL BALANCE.

SPECIFICATION forming part of Letters Patent No. 308,198, dated November 18, 1884.

Application filed December 5, 1883. (No model.)

*To all whom it may concern:*

Be it known that I, DANIEL L. ROBERTS, a citizen of the United States, residing at Royalton, in the county of Niagara and State of New York, have invented certain new and useful Improvements in Proportional Scales or Balances, of which the following is a specification.

The invention has for its objects to provide a scale or balance for accurately determining the proper quantity of salt to be added to any unknown quantity of butter, cheese, or other material requiring the addition of salt without calculation, as will be more fully hereinafter set forth. These objects I attain by the means shown in the accompanying drawings, in which—

Figure 1:
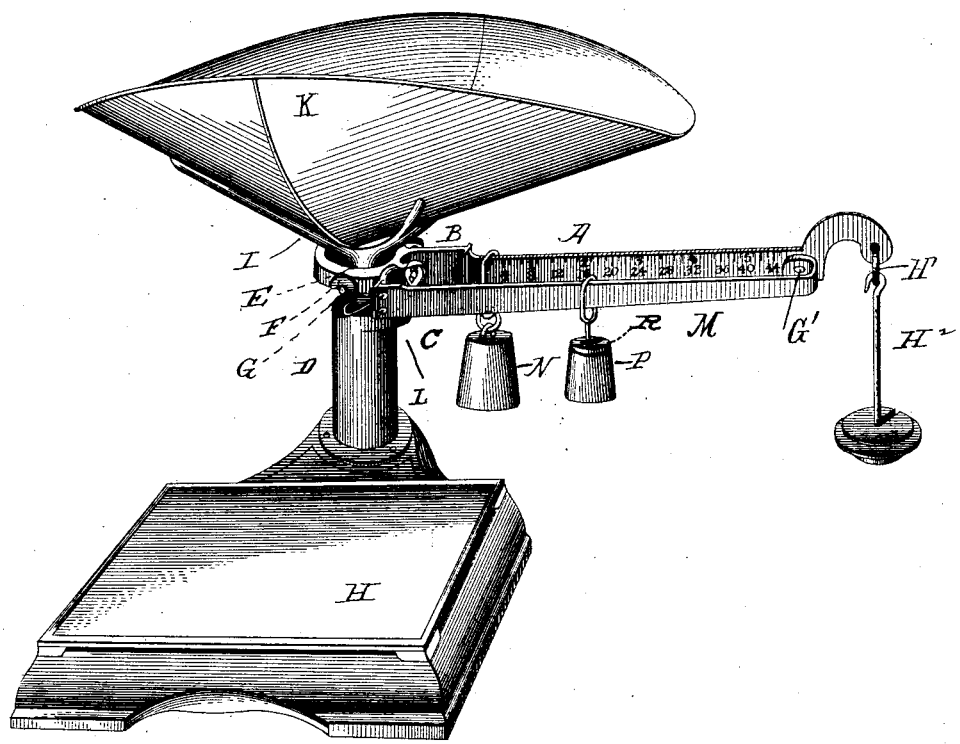
Figure 2:
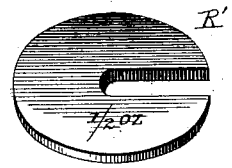
Figure 3:
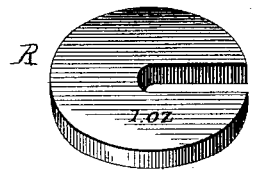

Figure 1 represents a combined platform-and-pan scale, showing my invention applied thereto; and Figs. 2 and 3 perspective views of the proportional weights employed in connection therewith.

The letter A represents the scale-beam, which is of the ordinary construction, and which is secured to the usual casting or head, B, provided with the projections C, having edges which rest in bearings at the upper portion of the standard D.

E indicates the vertical rod, which is hung by the hooks on the projections G of the head or casting before mentioned, the said projections being provided with edges, as shown. This rod connects below with the mechanism of the platform H in the usual manner, and its upper end is provided with arms I, forming a seat for the scale-pan K. The casting or head B is provided with a bracket, L, which is preferably cast with it, and to said bracket is secured the rear end of the metallic bar M by means of bolts, rivets, or other fastening devices. The forward end of the said bar is curved toward and secured to the forward end of the scale-beam by means of a rivet, G', or otherwise, and the forward end of the scale-beam is curved in the ordinary manner and provided with the usual link, H', to which the hooked balance-weight support H² may be attached. The scale-beam is provided with the usual weight, N, and the bar M with a similar sliding weight, P, whose normal position is at c, where it exerts no action. The sliding weight N is arranged upon the scale-beam in the usual manner, so as to determine weight, as ordinary, by sliding said weight back and forth upon the beam until the balance is obtained. The weight P is arranged so as to slide upon the bar M in the operation of salting butter, which is as follows: The butter or other article to be salted is placed in a suitable vessel either in the pan or upon the platform, as may be desired, the weight of the vessel alone being previously ascertained by the weight N. The butter or other material is then balanced with the weight P on the beam M, after which the particular weight, R or R', showing the marked proportion of salt required to the pound is placed on top of the weight P, when it again bears down the scale-beam. The salt is then placed with the butter or other article until the beam is again balanced, giving the proper amount to be employed. It will be seen that by proportioning the weights R and P, respectively, the proper proportion of butter and salt in any quantities may be positively determined without calculation. For instance, if the proportions of butter and salt are to be of one pound to one ounce, (1 oz.,) the proportions of the weights P and R, respectively, will be one pound to one ounce; or if the proportions of butter and salt are to be one pound (1 lb.) to one-half ounce, (½ oz.,) then the weight R' may be used, and by providing other detachable weights, like R and R', which may be applied to the top of the weight P, as described, different proportions of salt may be added to the butter, as occasion may require. The weight P in its normal position should rest at the rear of the bar M.

Having thus described my invention, what I claim as new, and desire to secure by Letters Patent, is—

The combination, with the graduated scale-beam of an ordinary scale and its sliding weight, of the beam M, secured to said scale-beam, the sliding weight P, mounted on said beam M, and the proportional weights adapted to be applied to the weight P to determine the quantity of salt required to a given quantity of butter as determined by the weight P, substantially as specified.

DANIEL L. ROBERTS.

Witnesses:
FRANK M. ASHLEY,
WASH H. CROSS.